United States Patent [19]
Kuromoto
[11] Patent Number: 4,502,723
[45] Date of Patent: Mar. 5, 1985

[54] OIL HYDRAULIC CIRCUIT FOR GRIPPING DEVICE

[75] Inventor: Kazunori Kuromoto, Komatsu, Japan
[73] Assignee: Kabushiki Kaisha Komatsu Seisakusho, Tokyo, Japan

[21] Appl. No.: 507,095
[22] Filed: Jun. 23, 1983
[30] Foreign Application Priority Data
Jun. 30, 1982 [JP] Japan .......................... 57-097250[U]
[51] Int. Cl.³ ........................ B66C 3/16; F15B 13/042
[52] U.S. Cl. ........................................ 294/88; 91/451
[58] Field of Search .................... 294/88, 106; 91/451, 91/452; 137/596.12-596.15, 495

[56] References Cited

U.S. PATENT DOCUMENTS 3,185,175 5/1965 Plate .............................. 137/596.12
3,937,128 2/1976 Hicks et al. ....................... 91/451 X
4,017,221 4/1977 Dezelan ..................... 137/596.12 X
4,317,466 3/1982 Ikeda et al. ...................... 91/451 X
4,452,479 6/1984 Terai et al. ........................... 294/88

*Primary Examiner*—Johnny D. Cherry
*Attorney, Agent, or Firm*—Armstrong, Nikaido, Marmelstein & Kubovcik

[57] ABSTRACT

A gripping device includes a plurality of articulate gripping fingers coupled to a support structure turnable with respect to a neck structure. The articulate fingers respectively have first and second segments pivotally movable by oil hydraulic cylinders. Oil hydraulic pressure is applied to the oil hydraulic cylinders from an oil hydraulic pump. A pilot relief valve which can provide a variable relief pressure according to a pilot pressure, is provided on the discharge line leading from the oil hydraulic pump, and can be connected to a directional control valve to an oil hydraulic cylinder, which can provide a variable pilot pressure according to the extent of depression of a clamping force setting pedal provided in an operator's room.

2 Claims, 2 Drawing Figures

OIL HYDRAULIC CIRCUIT FOR GRIPPING DEVICE

BACKGROUND OF THE INVENTION

This invention relates to an oil hydraulic circuit for a gripping device, which can provide a variable clamping force with which to grip an object.

The oil hydraulic circuit for a gripping device used for an operating machine, e.g., a construction machine, has a relief valve. The clamping force is usually changed by changing the preset relief pressure of the relief valve with an adjustment screw. Where the clamping force is frequently changed, however, the operation involved is felt very cumbersome. In addition, sound noise is liable to be produced from the relief valve.

SUMMARY OF THE INVENTION

The present invention has an object of providing an oil hydraulic circuit for a gripping device, which permits the preset relief pressure of a relief valve provided in an oil hydraulic circuit to be readily changed by an operator in an operator's room, thus permitting the clamping force to be readily changed without need of any cumbersome operation.

BRIEF DESCRIPTION OF THE DRAWINGS

The accompanying drawings illustrate an embodiment of the invention, in which.

DESCRIPTION OF THE PREFERRED EMBODIMENT

Figure 1:
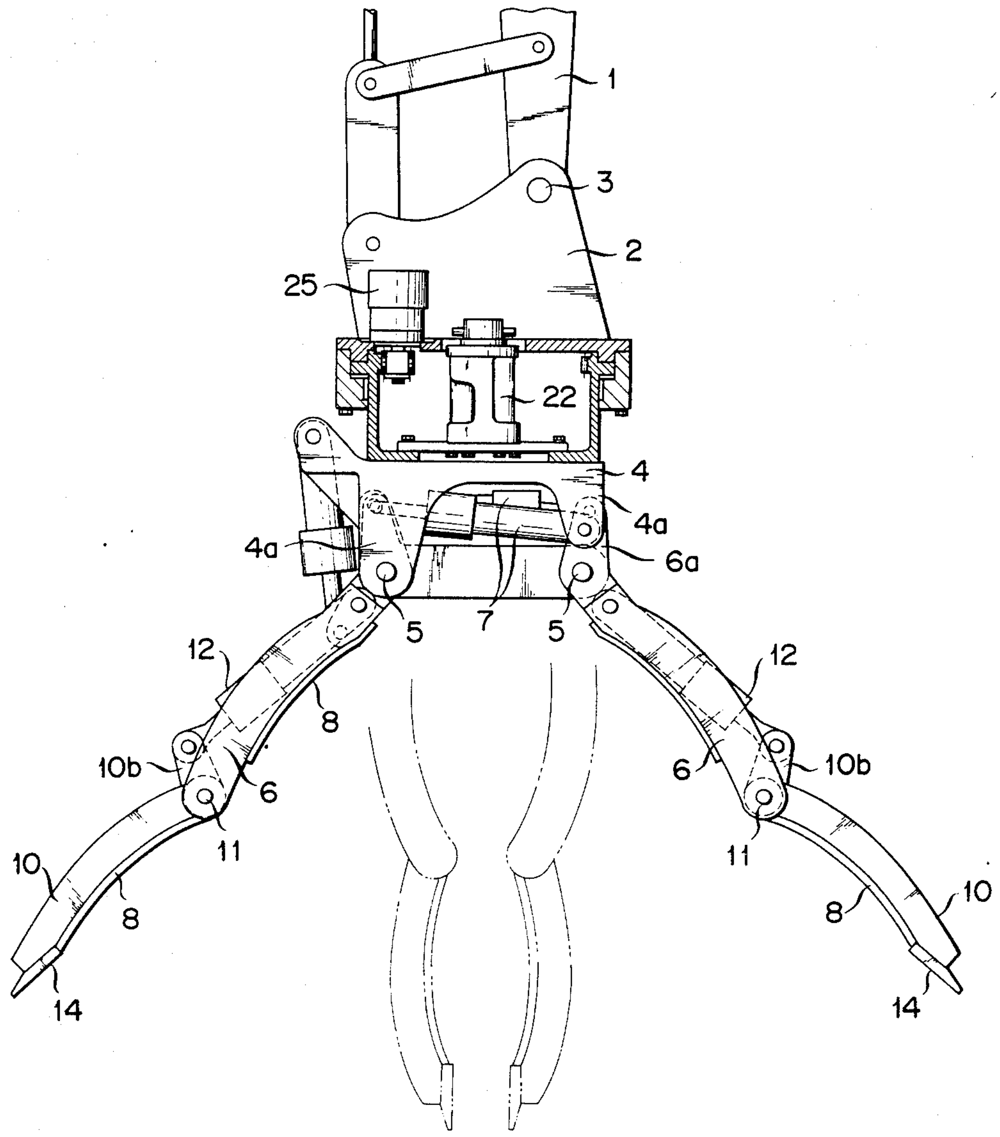
FIG. 1 is a front view showing a gripping device.

An embodiment of the invention will now be described in detail with reference to the drawings. Referring to FIG. 1, reference numeral 1 designates a boom of a construction machine (not shown). A neck structure 2 is pivotally coupled by a pin 3 to one end of the boom 1. A support structure 4 is secured to the underside of the neck structure 2. It can be turned by a motor 25, and it has a pair of lugs 4*a*. Three articulate gripping fingers each having first and second segments 6 and 10 are coupled to the lugs 4*a* of the support structure 4. More specifically, two of the first segments 6 of the articulate gripping fingers have their stem portions pivoted by pins 5 to one of the lugs 4*a*, while the remaining first segment 6 is pivoted by a pin 5 to the other lug 4*a*. The stems of these first segments 6 have respective levers 6*a*, and a pair of oil hydraulic cylinders 7 are connected between the free ends of these levers 6*a* on one hand and the support structure 4 on the other hand. The first segments 6 can be pivotally driven by the oil hydraulic cylinders 7. They each have a gentle articulate tip portion, and a pad member 8 is provided on the inner side of each of them.

The second segments 10 of the articulate fingers each have their stem portion pivoted by a pin 11 to the top of each first segment 6. The step portion of each second segment 10 has a lever 10*b*, and a second oil hydraulic cylinder 12 is connected between the free end of the lever 10*b* and the stem portion of the associated first segment 6. The second segments 10 can be turned with respect to the first segments 6 by these second oil hydraulic cylinders 12. They each have a tip claw 14, and a pad member 8 is also provided on the inner side of each of them. The hydraulic cylinders 7 for pivotally driving the first segments of the gripping fingers and the second oil hydraulic cylinders 12 for pivotally driving the second segments 10 are connected in an oil hydraulic circuit as shown in FIG. 2.

Figure 2:
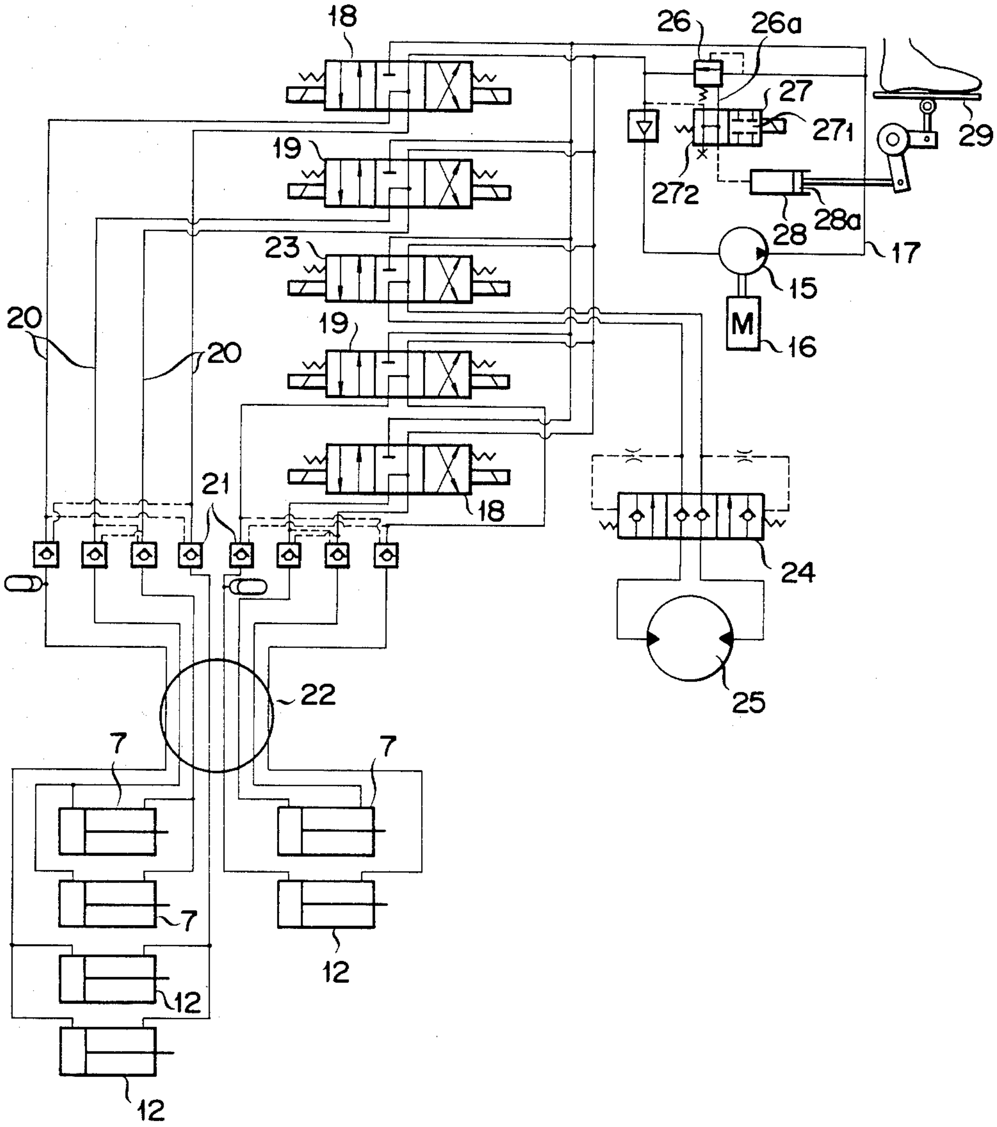
FIG. 2 is a connection diagram showing an oil hydraulic circuit.

Referring to FIG. 2, the circuit has an oil hydraulic pump 15 which is driven by an engine 16. The oil hydraulic operating fluid discharged from the pump 15 is supplied through a duct line 17 to operating valves 18 and 19 provided for the respective oil hydraulic cylinders 7 and 12. From these operating valves 18 and 19, it is further supplied through duct lines 20, pilot check valves 21 and a swivel 22 to the oil hydraulic cylinders 7 and 12. Further, it is partly supplied through a further operating valve 23 and a counter balance valve 24 to the motor 25.

A pilot relief valve 26 is provided on the duct line 17 leading from the discharge side of the oil hydraulic pump 15. It has a pilot line 26*a*, which is adapted to be connected to an oil hydraulic cylinder 28 through a directional control valve 27, e.g., a solenoid valve. The directional control valve 27 can be switched from an "ON" position $27_2$ to an "OFF" position $27_1$ by operating a switch from an operator's room (not shown). The piston 28*a* of oil hydraulic cylinder 28 is interlocked to a clamping force setting pedal 29. The pilot pressure led to the pilot line 26*a* of the pilot relief valve 26 can be varied according to the extent of depression of the pedal 29. Thus, the relief pressure can be set to a desired value. The oil hydraulic circuit described above has a total of six clamp cylinders 7 and 12 because the gripping device has three gripping fingers.

As has been described in the foregoing, according to the invention the pilot relief valve 26, which can supply a variable relief pressure according to the pilot pressure, is provided on the oil hydraulic pump discharge duct line 17 through which oil hydraulic pressure is supplied to the clamp cylinders 7 and 12 of the clamping device, and is adapted to be connected to the oil hydraulic cylinder 28, from which a desired oil hydraulic pressure can be generated by the clamping force setting pedal 29 provided in the operator's room, through the directional control valve 27. Thus, the clamping force with which to grip an object can be changed by switching the directional control valve 27 to the "on" position $27_2$ and depressing the clamp force setting pedal 29 to a desired extent. At this time, the oil hydraulic pressure supplied from the oil hydraulic pump 15 to the oil hydraulic cylinders 7 and 12 is partly relieved according to the preset pilot pressure of the pilot relief valve 26. It is thus possible to adjust the clamping force of the first and second segments 6 and 10 of the articulate fingers that are pivotally driven by the oil hydraulic cylinders 7 and 12 to a desired value. For this reason, an object which is very liable to be broken can be gripped reliably without the possibility of being broken. In addition, unlike the prior art, the clamping force can be changed without need of any cumbersome operation. Further, the clamp force can be varied by varying the extent of depression of the clamping force setting pedal while observing the clamped object. An object thus can be clamped with a suitable clamping force, thus eliminating the possibility of occasional dropping of the clamped object. The preset clamping force can be held by switching the directional control valve 27 to the "off" position $27_1$.

What is claimed is:

1. In a gripping device including mounting means, a plurality of articulate gripping fingers coupled to said mounting means, each gripping finger having a first segment pivotally coupled to said mounting means and a second segment pivotally coupled to said first segment, a plurality of first hydraulic cylinders each for operating said respective first segments and a plurality of second hydraulic cylinders each for operating said respective second segments, a hydraulic circuit for the gripping device comprising:

a hydraulic pump;

pilot-operated relief valve means disposed in a conduit connecting said hydraulic pump with said first and second hydraulic cylinders, said relief valve means having a pilot pressure conduit connected thereto and a relief pressure thereof being variable according to a pilot pressure in the pilot pressure conduit;

a third hydraulic cylinder for providing a variable pilot pressure to said pilot-operated relief valve means, said third hydraulic cylinder being connected to the pilot pressure conduit and having slidably mounted therein a piston;

a clamp force setting pedal operatively connected to the piston of said third hydraulic cylinder; and a directional control valve disposed in the pilot pressure conduit for selectively supplying a variable pilot pressure to said pilot-operated relief valve means.

2. A hydraulic circuit according to claim 1 wherein said directional control valve is solenoid-operated and has formed therein a communicating position and a blocking position and is normally held in the communicating position.

* * * * *